United States Patent [19]
Green et al.

[11] Patent Number: 5,165,828
[45] Date of Patent: Nov. 24, 1992

[54] CAM-ACTUATED THREAD TAPPER

[75] Inventors: Richard C. Green, Hatboro; Glen J. Pierson, Telford; Kenneth A. Swanstrom, Doylestown, all of Pa.

[73] Assignee: Penn Engineering & Manufacturing Corp., Danboro, Pa.

[21] Appl. No.: 743,701

[22] Filed: Aug. 12, 1991

[51] Int. Cl.⁵ ............................................. B23G 1/18
[52] U.S. Cl. .................................. 408/129; 318/39; 470/198
[58] Field of Search ............ 10/129 R, 139 R, 136 R; 408/3, 129; 318/39, 35, 51; 470/181, 198

[56] References Cited

U.S. PATENT DOCUMENTS

| | | | |
|---|---|---|---|
| 2,472,744 | 6/1949 | Esson | 408/129 |
| 4,656,405 | 4/1987 | Kiya et al. | 318/39 |
| 4,879,660 | 11/1989 | Azakura et al. | 318/39 |
| 4,912,385 | 3/1990 | Kawamura et al. | 318/603 |
| 5,010,286 | 4/1991 | Nakamura et al. | 318/39 |

FOREIGN PATENT DOCUMENTS

| | | | |
|---|---|---|---|
| 1238368 | 7/1960 | France | 408/129 |
| 185519 | 8/1988 | Japan | 10/129 R |
| 8705839 | 10/1987 | PCT Int'l Appl. | 10/129 R |
| 9014192 | 11/1990 | PCT Int'l Appl. | 10/129 R |

*Primary Examiner*—Daniel W. Howell
*Attorney, Agent, or Firm*—Gregory J. Gore

[57] ABSTRACT

An electronic thread tapper includes a cam-operated feed mechanism which drives the tap carriage rigidly in the advance direction only. Separate force means are employed to move the carriage in the retract direction when the tap is being withdrawn from the work material. Spindle and feed motors operate separately, but are cycle-coordinated during a dwell period between tapping strokes. By measuring any position error developed between the spindle and feed positions, a fault condition, such as a worn tap, a workpiece material defect, or an obstruction in the machine can be sensitively detected.

11 Claims, 7 Drawing Sheets

CAM-ACTUATED THREAD TAPPER

FIELD OF THE INVENTION

This invention relates to a tapping control system for producing threaded machine parts. More particularly, the invention relates to a tapping control system for regulating the tapper's spindle and feed motors. It also relates to a mechanical linkage for controlling the feed carriage of the tapper.

BACKGROUND OF THE INVENTION

In machining operations which require high speed and accurate thread tapping, the old, floating-type tapper which forcefully pushes a rotating tap into work material has been replaced by an automated rigid-type tapper in which a carriage is rigidly mounted to a base by a lead screw and is turned in synchronization with rotation of the spindle motor. Synchronization is achieved by sophisticated and accurate positional motors which receive commands from a central controller. Either the position of the feed motor which turns the feed screw or the position of the spindle motor is used as a reference to lead the other in a synchronized ratio which corresponds to the pitch of the tap. Rigid-type synchronized tappers, however, have problems maintaining the accuracy of the required spindle rotation and feed advance ratio at high speed. This problem is caused, among other things, by the difference in gearing and inertia between the separate spindle and feed components.

DESCRIPTION OF THE PRIOR ART

To solve the problem described above, various systems have been devised to regulate synchronization by either motor torque and the feed or spindle rotation acceleration. Also, compensation has been added to the controller systems for accommodating the difference in acceleration rates between the spindle motors and the feed motors.

U.S. Pat. No. 5,010,286 to Nakamura et al describes a thread tapping control system in which the synchronous work is controlled in accordance with acceleration and deceleration capacity of the spindle servo motor. U.S. Pat. No. 4,879,660 to Asakura et al discloses a thread cutting synchronization system where the synchronization is compensated for by the acceleration either the feed or spindle motors. U.S. Pat. No. 4,912,385 to Kawamura et al enhances tapper synchronization capability between feed motor and spindle motors by a pulse distribution circuit which employs a variable time constant permitting greater accuracy to prevent overshooting when the rotational speed of the spindle is high. The above-mentioned patents are incorporated by reference as though fully set forth herein.

Although the advancements described above in the rigid-type synchronized tapping machines have increased speed and tapping accuracy, the full potential of applying modern motion control technology to thread tapping machining has not been fully realized. All of the prior art systems use a closed loop servo system to synchronize the two tapping axes of motion. They utilize a master/slave relationship between the feed and spindle motors where the motion of one determines the motion of the other. With this type of system, synchronization is achieved, but minor fault conditions can be masked because the slave is always adjusted to follow the master. The motors may require high current levels if the deviation is great, which can cause unwanted heating and shortened motor life. There is also an inherent time lag in the response of the slave to the master, which adversely affects both speed and accuracy.

The applicants, however, have discovered that speed and accuracy can better be achieved by employing a semi-rigid, rather than fully-rigid, feed mechanism in combination with cycle-coordinated, independently controlled, feed and spindle motors. The applicants' novel system provides a fault detection and operator safety system which is not as easily achieved with a fully synchronized, closed-loop system.

SUMMARY OF THE INVENTION

As will be more fully described herein, the applicant has devised a cam-operated feed mechanism which only drives the tap rigidly in the advance direction when the tap enters and threads the work material. Separate force means are employed to return the carriage in the retract direction when the tap is being withdrawn. The retract force means are adjusted to apply an optimal withdrawal force to the carriage which is less than the advance force of the reciprocating drive cam. Therefore, the present invention is not mechanically rigid continually, but rigid only during tapping when it is required.

This design is an advancement over the prior art because it solves a major problem with the bi-directional, rigid, screw-type feed systems. The problem is to accurately withdraw the tap from the threaded material in the retract direction along the same path as it entered the work material. When withdrawing the tap from the work, damage may be done to the threads because of inaccurate synchronization. The withdrawal of the tap, however, accomplishes nothing except to mildly chase the threads and to remove the tap from the workpiece. Unfortunately, this portion of the machining cycle requires the same amount of time as the thread cutting because the speed of the process in the retract direction, just as in the advance direction, is limited by the acceleration and inertia of the various machine components. The applicants' device, on the other hand, permits withdrawal of the tap at higher speeds and with less chance of damage to the threads since, in the retract direction, there is very little force on the tap. Therefore, even if there is deviation in the coordination between the spindle and feed motors due to excessive speed, little damage can be done to the threads because neither mechanical motion is rigidly applied to the workpiece.

A unidirectional force-transmitting feed mechanism employed by the applicants comprises a reciprocating feed cam which is acted upon by a carriage-mounted follower. Retract force means are supplied by air cylinders or similar devices. In a preferred embodiment of the present device, the air pressure to the retract air cylinders is varied at given points of the machining cycle to enhance the speed and accuracy of the tapping operation.

The present invention further departs from the prior art in that the spindle and feed motors are operated by two separate controllers which have no positional synchronization to each other during the tapping operation. Each is moved along a separate, ideal positional path which is stored in its own controller. Both paths ideally coincide with the pitch of the tap at the point when the tap is threading the workpiece. Communication, and hence coordination, between the two axis of motion takes place only during a dwell period at the end of each operating cycle when both the spindle and feed motors are reset to a home position. Then, a master controller simultaneously instructs both spindle and feed controllers to repeat their operation throughout a timed cycle from the home position, marked in time.

The surprising result of the present system is that accurate tapping can be achieved with independently operating feed and spindle motors. The applicants have achieved the motion coordination required by thread tapping by coincidental positioning of the two axis of motion, rather than employing continuous synchronization. Using this system, the applicants have found that with a cyclically repeating process such as thread tapping where the cycle period is short, only a small error is developed during each cycle. After each cycle, any error is removed by the reset function described above during the dwell period and therefore position error does not accumulate between cycles.

Because the spindle and feed motors are permitted to operate separately, it is possible that a worn tap, a workpiece material defect, an obstruction in the machine, or other fault condition may be sensitively detected by measuring any position error developed in either of the motion systems. This degree of sensitivity is not achievable in the closed-loop synchronized system of the prior art where slowing of either the spindle or the feed motors merely slows the other, or delivers more electrical current to speed up the motor which has slowed.

Current levels in master/slave motion control systems must be high because speed changes are unpredictable and must be made quickly due to the differences in inertia of the synchronized components. In the present invention, however, electrical current levels of the motor drive amplifier are lower than master/slave systems because each can be tuned to the requirements of a known motion pattern, inertial load, and tapping force. Hence, it provides the ability to sensitively detect operating fault conditions, such as a worn tap or a workpiece defect, and also provides operator safety by detecting and immediately halting any interference with either the tap rotation or carriage motion. In the present invention when an unacceptable level of error has been detected, the machine halts its operation and the movement of both the feed and spindle are stopped and the power to the motors is switched off.

It is, therefore, an object of the present invention to devise a high speed, efficient and accurate thread-tapping machine which also provides sensitive fault detection and enhanced operator safety.

This and other objects are achieved by providing a thread-tapper with a base and a carriage slideably affixed to the base to provide a working stroke having advance and retract directions of motion. A spindle motor is affixed to the carriage including a spindle and chuck connected thereto for holding and rotating a tap. A feed cam is rotatably affixed to the base, and a follower affixed to the carriage in contacting engagement with the cam. Retract force means such as air cylinders or springs for urging the carriage and the follower against the cam are affixed between the base and the carriage. A feed motor is connected to the cam and rotation of the cam causes the tap to be forcibly moved in the advance direction. The force on the carriage as it advances is greater than in the retract direction, the retract force being supplied only by the air cylinders. Both the feed motor and spindle motor receive operating instructions from individual controllers which contain motion patterns stored in memory for repeatably executing a cyclical pattern of movement. Both the carriage and the spindle execute independent, but simultaneously initiated timed motion cycles. Coordination between the two controllers is achieved during a dwell period which is the time between when the first of either the carriage or the spindle has completed its cycle and when the two are reinitiated simultaneously from a home position. The home position marks the starting point of both cycles in position and time. The carriage and spindle mechanisms include position sensing means which are connected to their respective controllers.

Both position sensors are connected to fault detection means for detecting when either the position of the carriage or the spindle is outside of an acceptable deviation of its pattern of motion stored in the memory of its controller. When a fault has been detected, the operation of both the spindle and feed motors is halted. Air cylinders or springs affixed between the base and the carriage provide the force means for retracting the feed carriage and the air pressure may be varied throughout the path of the carriage to compensate for the varying force needs of tapping, carriage direction reversal, and tap withdrawal. The applicants' invention is described in more detail by the following drawings and description of the preferred embodiment.

DESCRIPTION OF THE PREFERRED EMBODIMENT

Figure 1:
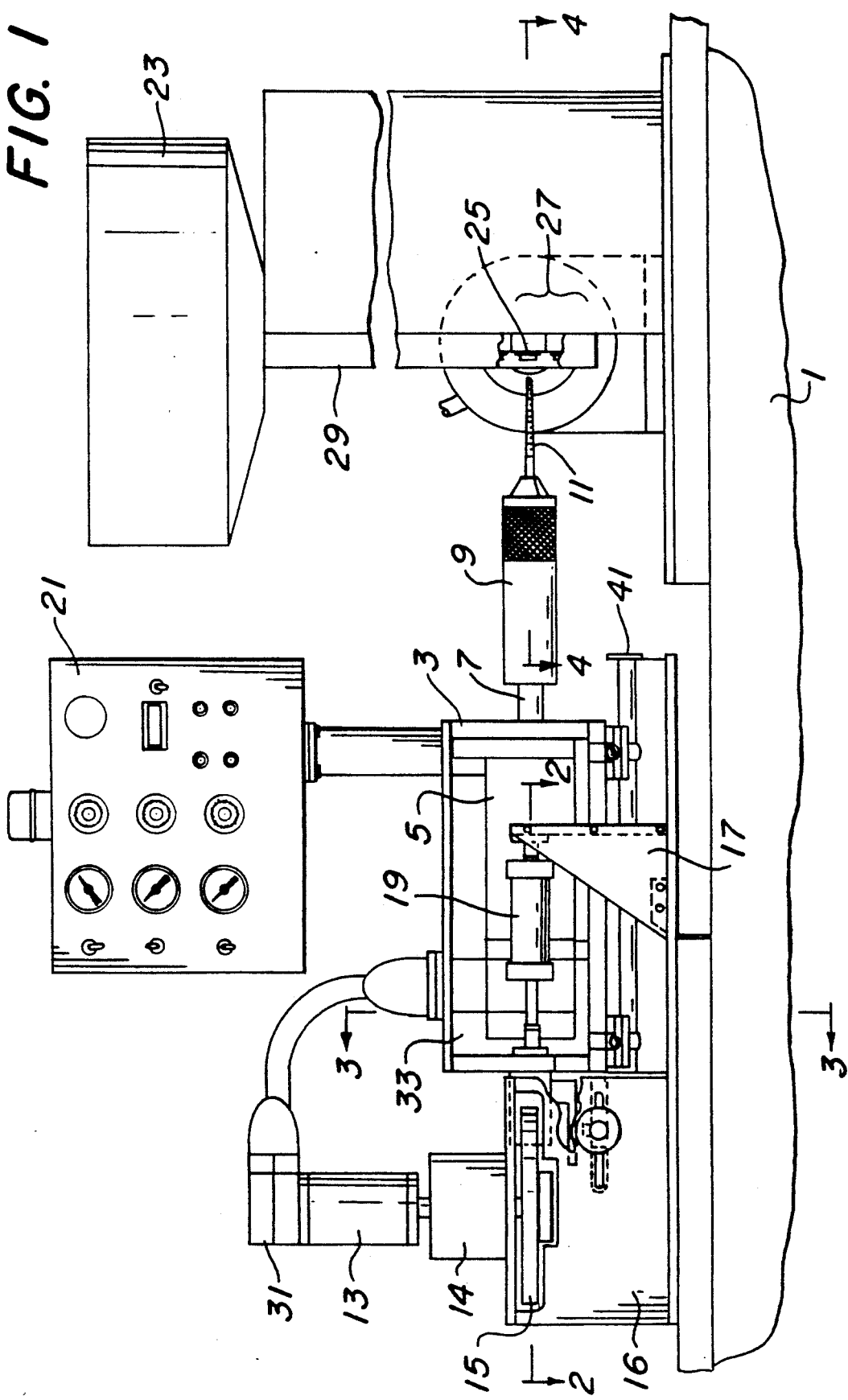
FIG. 1 is a front view of the present thread tapping invention.

Referring now to FIG. 1, a front view of the present invention is shown with the tapping and motion control systems at the left, and the nut feed and tapping station shown at the right. Both components are rigidly affixed to base 1. A carriage 3 is slideably affixed to base 1 by way of guide rails 41. The carriage carries spindle motor 5, which rotates spindle 7 and chuck 9. Tap 11 is mounted into chuck 9. The feed motor 13 drives feed cam 15 through speed reducer 14. The feed cam 15 moves carriage 3 by way of a follower shown more clearly in FIG. 2. The feed components are mounted to chassis 16 which is rigidly affixed to base 1. Brackets 17 are affixed to base 1 and support retract air cylinder 19 which is affixed between bracket 17 and the frame of carriage 3. Control panel 21 houses all controller circuitry and pneumatic pressure gauges.

On the right side of FIG. 1, the nut feed system includes hopper 23, delivery slide 29, and tapping station 27. Individual nuts 25 are delivered to the tapping station from the feed hopper by gravity down through slide 29.

Figure 2:
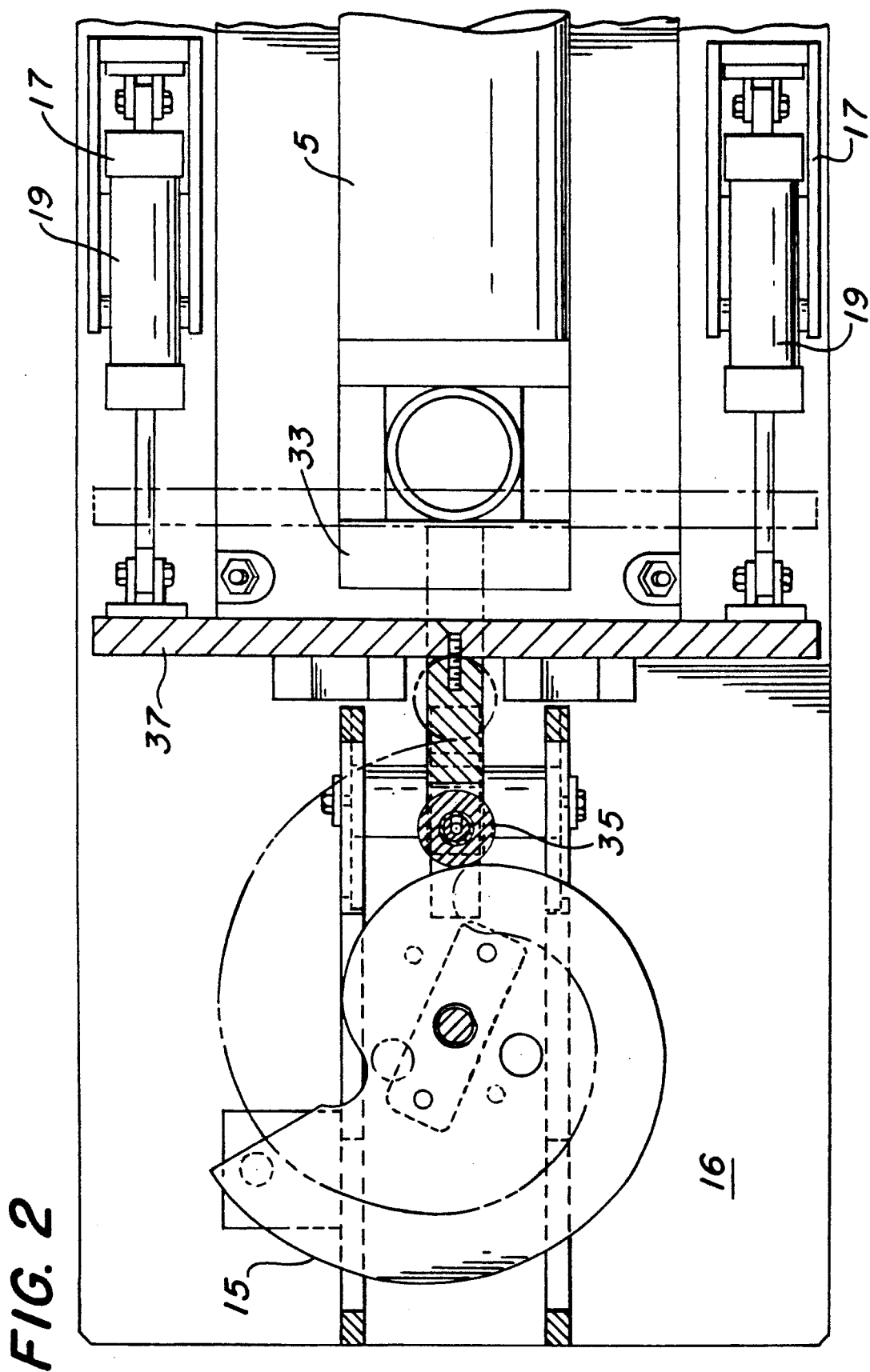
FIG. 2 is a top sectional view taken from FIG. 1 as indicated in that figure.

Referring now to FIG. 2, greater detail of the spindle feed mechanism is shown. The feed cam 15 is rotatably mounted to chassis 16 which is affixed to the base. Roller follower 35 is affixed to the frame of the carriage 37 and is held in contact with the surface of the feed cam 15 by air cylinders 19 which are pressurized to force the carriage in the direction of the feed cam. Brackets 17, which are affixed to the base, support the air cylinder. Spindle motor 5 is affixed to the carriage and includes angular position sensor 33.

Figure 3:
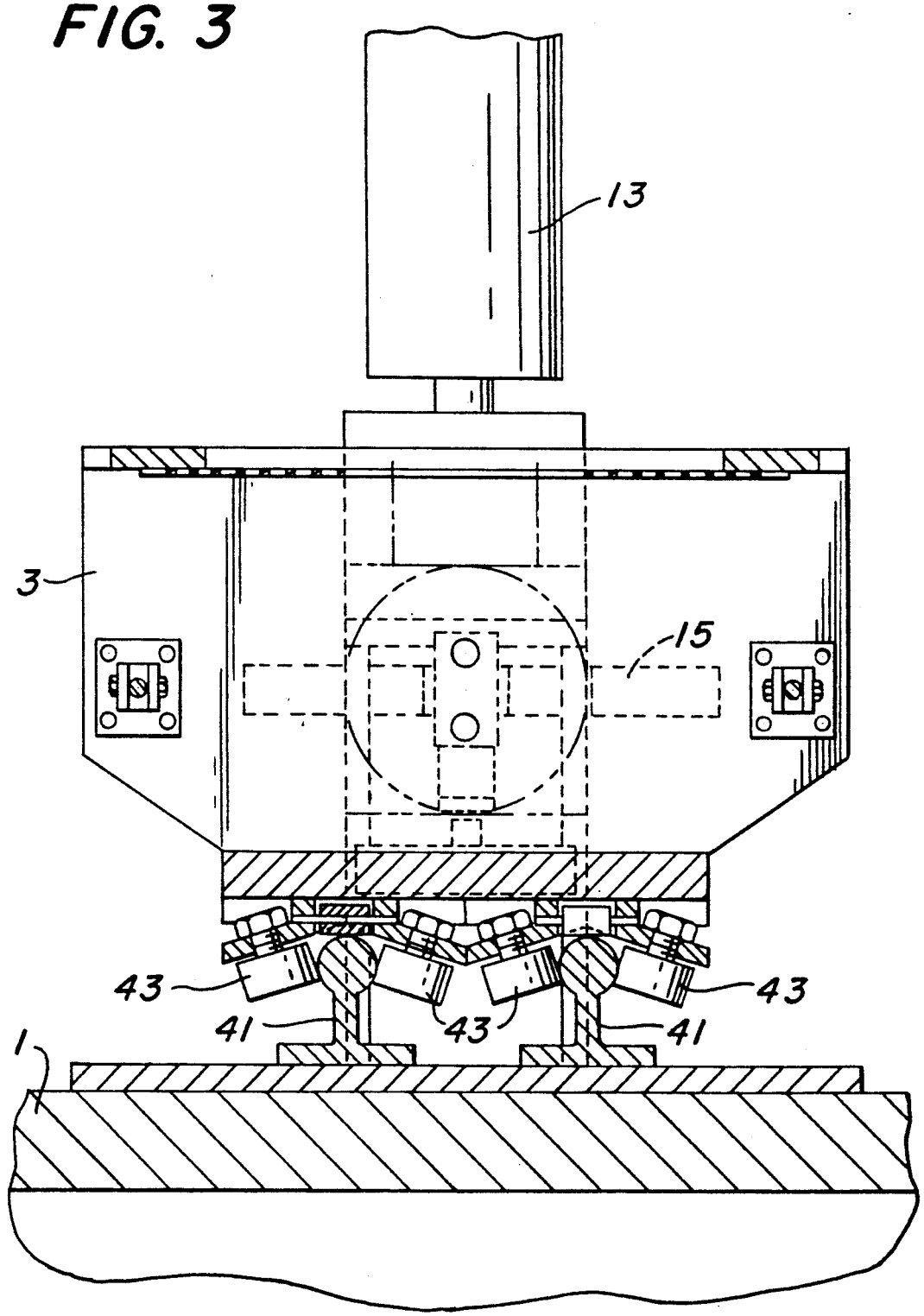
FIG. 3 is a side sectional view taken from FIG. 1 as shown in that figure.

Referring now to FIG. 3, a side sectional view of the carriage assembly is shown. Cam feed motor 13 rotates cam 15 which regulates the motion of the spindle carriage as more clearly described above with reference to FIG. 2. Guide rails 41 are affixed to base 1 and support the carriage assembly. Roller bearings 43 ensure that the carriage remains securely, but slideably affixed to the base with minimal friction between the carriage and guide rails 41.

Figure 4:
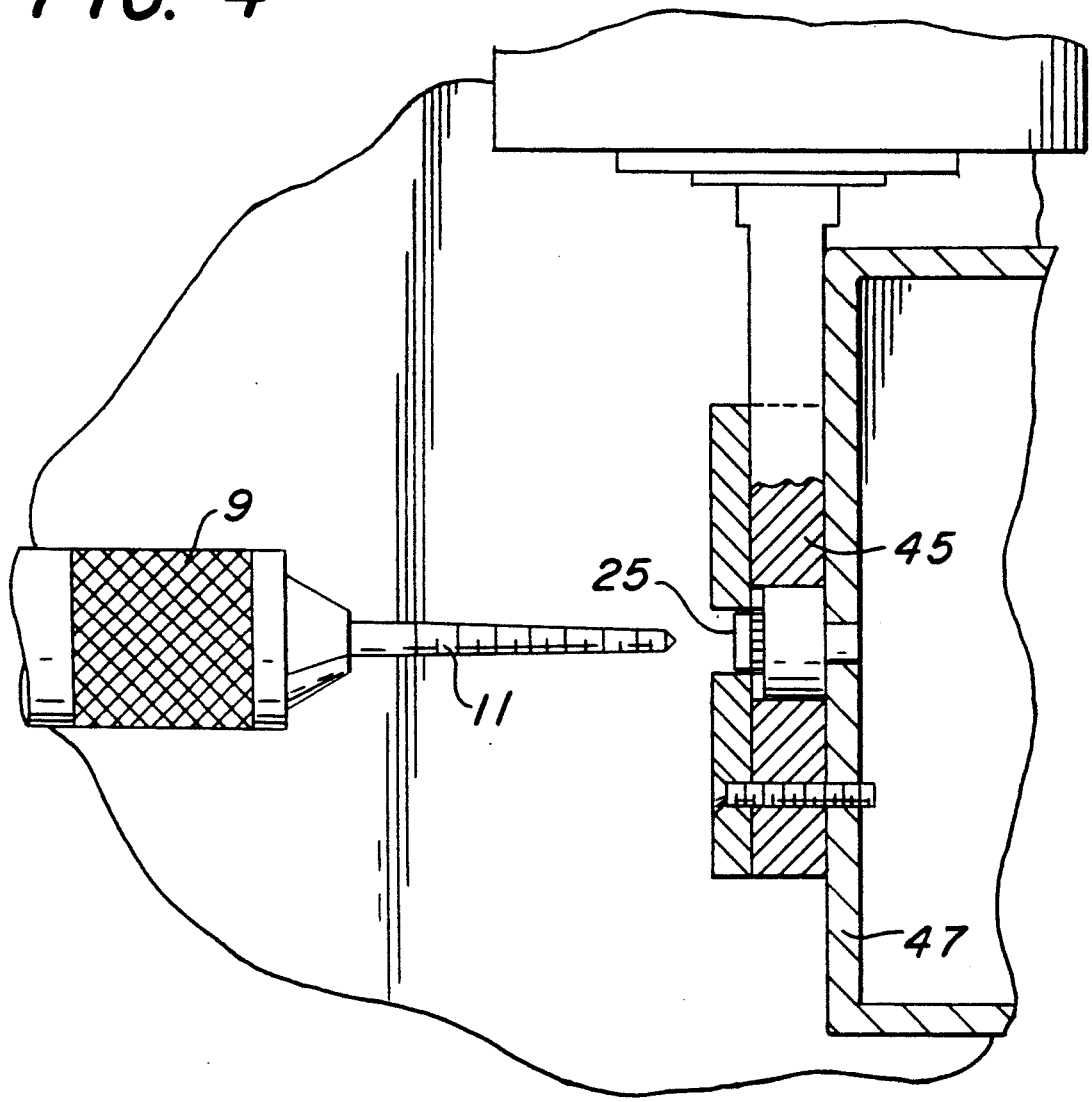
FIG. 4 is a top sectional view taken from FIG. 1 as shown in that figure.
Figure 5:
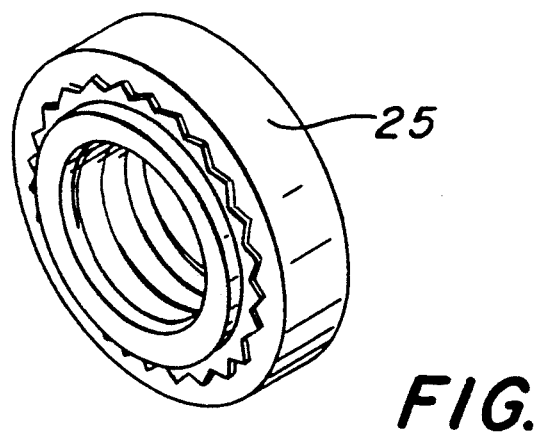
FIG. 5 is an isometric view of the nut workpiece which is threaded by operation of the present invention.

Referring now to FIG. 4, a top sectional view of the tapping station is shown. Chuck 9 carries tap 11 which through rotation of spindle motor and motion of the feed carriage produces threads in nut 25. Individual nuts as depicted in FIG. 5 are delivered to the tapping station where they are gripped by movable jaw 45 against stationary jaw 47. After tapping has been completed, nut 25 is released from the clamping jaws and the next nut to be tapped is delivered in its place and clamped for tapping.

Figure 6:
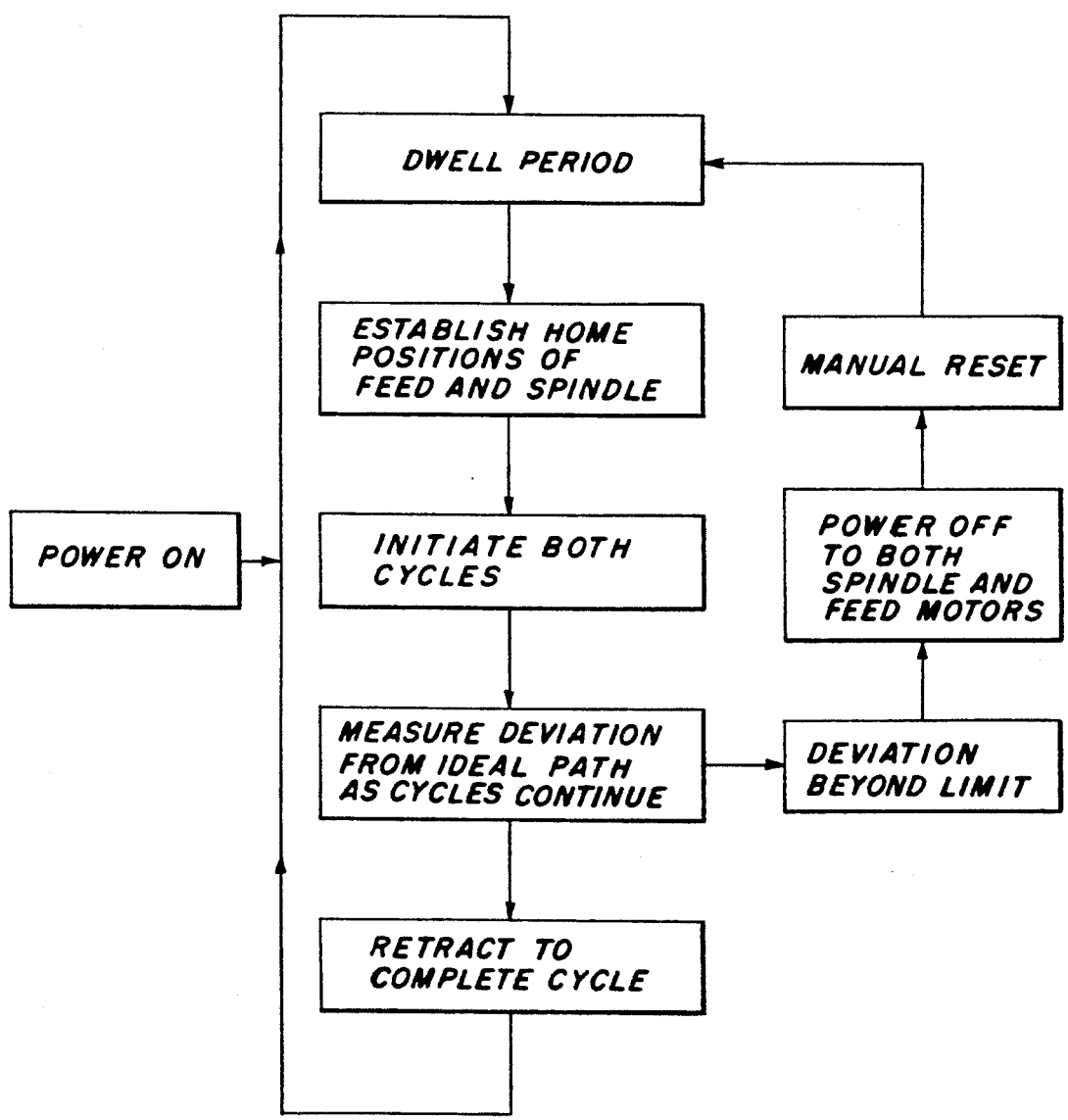
FIG. 6 is a diagram showing the operational sequence of system control in the operating system of the present invention.

Referring now to FIG. 6, a schematic diagram of the control system of the present invention is shown. Both spindle motion and feed motion are independently controlled by separate controllers. Each controller has a motion pattern stored in memory which is executed over a timed cycle. A master controller initiates each tapping cycle from a home position which is marked in time and place, and which is the beginning point of each cycle for both spindle and feed systems. Both the spindle and feed systems have separate fault detectors which measure error between an ideal position path and their actual position. Position sensors on both motion systems monitor actual position. When detected error is greater than an allowable maximum deviation, a fault is determined and the master controller is signaled which, in turn, stops the operation of both the motion systems by turning off the power to the motors. A manual reset is then required to return the tapper to its home position.

Figure 7:
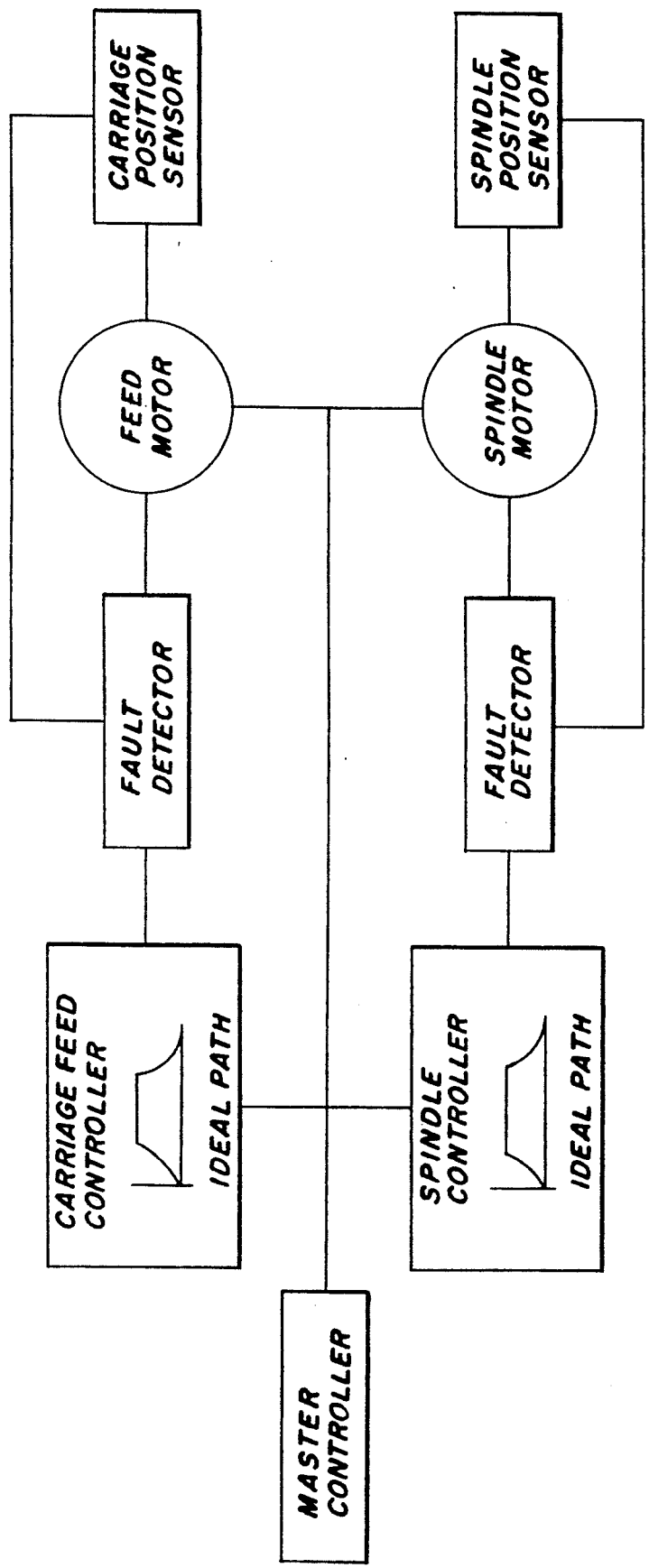
FIG. 7 is a schematic diagram showing the control system for coordinating the spindle motor and feed motors of the present invention.

Referring now to FIG. 7, the operating sequence performed by the master controller is shown. From a dwell position, a home position is established for both the spindle and feed mechanisms. Timed cycles representing an ideal position path throughout each cycle is initiated simultaneously for both systems. During each system, the deviation between the actual path of each mechanism and its ideal position path stored in memory is measured. If the measured deviation is greater than an allowable maximum, a fault condition is determined and both mechanisms are immediately halted and the power turned off. If the measured deviation is within an allowable tolerance, each cycle is completed and both motion systems returned to a home position during the dwell period. There may be included means for adjusting the deviation limit to accommodate changes in tap size or work material.

Figure 8:
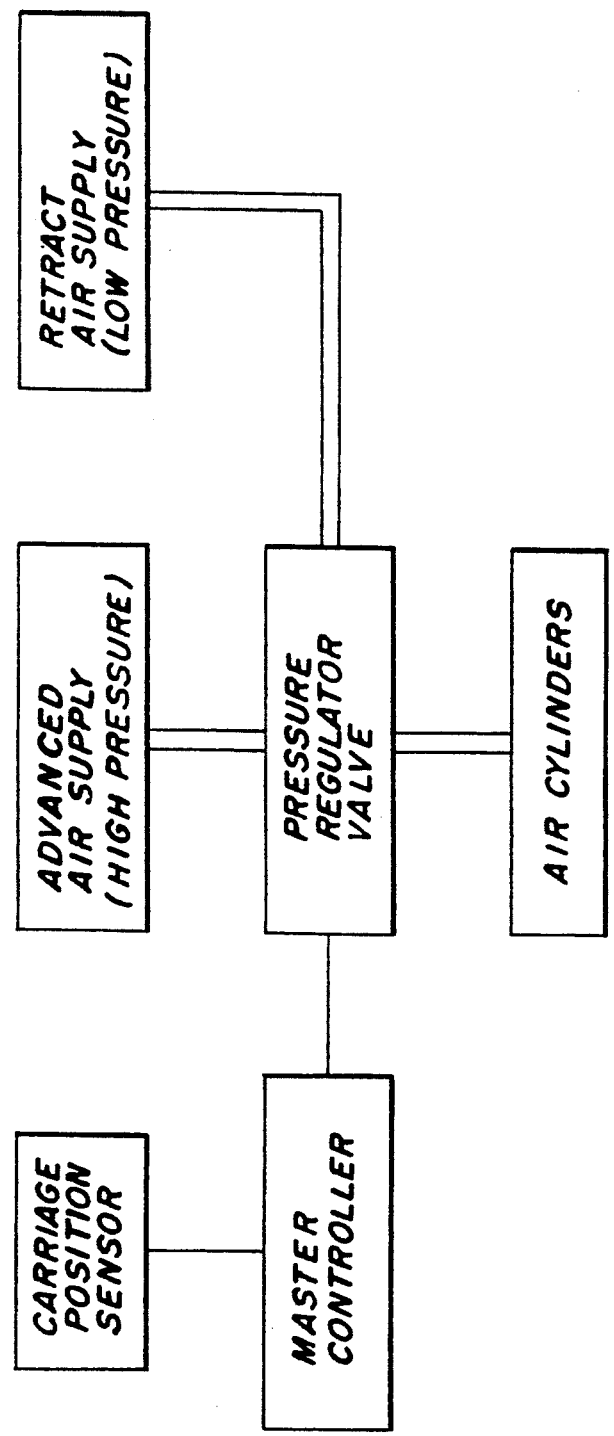
FIG. 8 is a schematic diagram of the electrical and pneumatic circuit for regulating pressure to the retract cylinders in one embodiment of the present invention.

Referring now to FIG. 8, a diagram of the pneumatic circuit is shown. In an alternate embodiment of the present invention, the master controller is instructed by the carriage position sensor of points along the carriage path. It may be desirable to regulate the pressure of the retract cylinders at different points along the path of the carriage. The retract force is changed by regulating the air pressure to the cylinders. The master controller which monitors carriage position instructs a regulator between the air supply and the cylinders for effecting the air pressure change when the carriage is at the fullest extent of its stroke. In cases where the retract force is different from the advance force between the carriage and the cam, a simple solenoid-operated 3-way valve is employed to change pressure levels to the air cylinders. It should be understood that the changes in retract force can be modulated between more than the two stages mentioned above.

OPERATION

The operation of the present thread tapper follows the sequence shown in FIG. 6. Initially, turning on the power to the thread tapper, the air pressure systems are powered up and displayed to the operator on the gauges shown on panel 21 of FIG. 1. The spindle and feed motors are then instructed by the master controller to establish their operating cycle,s home position. Starting the machine is then initiated by the operator.

Each spindle and feed mechanism begins operating on its individually programed cycle. A timed motion cycle is selected and stored in the memory of each controller so that spindle and carriage motions correspond to the pitch of the thread on the tap at the points of the carriage stroke when the tap is threading the nut. At the completion of each cycle, the carriage feed and spindle mechanisms return to a home position and then are re-initiated simultaneously to begin the next successive cycle and so forth as the tapping operation continues.

After each nut is tapped, it is ejected downward from the tapping station and the next blank nut is delivered from a supply hopper above through a vertical delivery slide. The feeding of nuts to the tapping station and operation of the clamping jaws and ejection mechanisms are well-known in the art, and separately, are not part of the claimed inventions.

As described above, the tap is moved through the blank nut by the direct force of the feed cam on the carriage follower and the motion of the carriage in the retract direction is supplied by air cylinders only. This pressure may be regulated to adjust for tapping speed and a low pressure retract cycle when desirable. When it is required that the pressure in the air cylinders be regulated during each cycle to effect desired pressure changes, a three-way solenoid air valve may be used to change pressure levels to the air cylinders as desired. In this case, the master controller which monitors the carriage position, signals the solenoid valve to change cylinder pressure at the desired points of carriage position. For example, it may be desired that the pressure cylinders have a much greater pressure during the advance portion of the carriage stroke in order to prevent over-shooting of the carriage at the fullest extent of its stroke. When the carriage begins retracting, the air pressure may be lessened so that the tap is removed from the nut under minimal retract force. Thus, any possible miscoordination between the spindle and feed motions as the tap is withdrawn from the nut will have the least effect on the quality of the tapped threads.

It should be understood that the above description discloses specific embodiments of the present invention and are for purposes of illustration only. There may be other modifications and changes obvious to those of ordinary skill in the art which fall within the scope of the present invention which should be limited only by the following claims and their legal equivalents.

What is claimed is:

1. A thread tapper, comprising:

a base;

a feed carriage slideably affixed to said base to provide a working stroke having advance and retract directions of movement;

a spindle motor affixed to the carriage including a spindle and chuck connected thereto for holding and rotating a tap;

a feed motor connected to said carriage which causes the tap to be selectively moved in the advance and retract directions;

a first controller connected to said feed motor which contains a motion pattern stored in memory for repeatably executing a cyclical pattern of movement of said carriage over a timed cycle throughout its stroke, the positions of said carraige during its stroke being controlled independently of the spindle rotation;

a second controller which also contains a cyclical pattern of spindle rotation stored in memory for repeatably executing a pattern of spindle rotation over a timed cycle; and a dwell period defined by the point in time when the first of said carriage cycle or said spindle cycle has been completed and when both cycles are thereafter reinitiated simultaneously from a home position, said home position being the starting point of both cycles in position and time.

2. The thread tapper of claim 1, wherein said carriage motion pattern and said spindle motion pattern coincide with the pitch of said tap.

3. The thread tapper of claim 2, including carriage position sensing means and spindle angular position sensing means, both of said sensing means connected to said controller, and fault detection means for detecting when either the position of the carriage or the spindle is outside of an acceptable deviation from their patterns of motion stored in memory in said controller.

4. A thread tapper, comprising:

a base;

a carriage slideably affixed to said base to provide a working stroke having advance and retract directions of movement;

a spindle motor affixed to said carriage, including a spindle and chuck connected thereto for holding and rotating a tap;

a feed cam rotatably affixed to said base;

a follower affixed to said carriage in contacting engagement with said cam;

retract force means for urging said carriage and said follower against said cam, said means affixed between said base and said carriage;

a feed motor connected to said cam whereby the rotation of the cam causes the tap to be moved in the advance direction at a greater force than in the retract direction, said retract force being supplied only by said retract force means;

a first controller connected to said feed motor which contains a motion pattern stored in memory for repeatably executing a cyclical pattern of movement of said carriage over a timed cycle throughout its working stroke, the positions of the carriage during its stroke being controlled independently with the spindle rotatino;

a second controller containing a cylcical pattern of spindle rotation stored in memory for repeatably executing a pattern fo spindle rotation over a timed cycle; and a dwell period defined by the point in time when the first of said carriage cycle or said spindle cycle has been completed and when both cycles are thereafter reinitiated simultaneously from a home position, said home position being the starting mark of both cycles in both position and time.

5. The thread tapper of claim 4, further including a tapping station and means for separately delivering a supply of nuts to said station, said station including means for holding one of said nuts in a position with respect to the movement of said tap to effect the cutting of threads into one of said nuts.

6. The thread tapper of claim 5, wherein said carriage motion pattern and said spindle motion pattern coincide with the pitch of said tap so that threads are cut into one of the nuts and the tap retracted from the nut with minimal force.

7. The thread tapper of claim 6, including carriage position sensing means and spindle angular position sensing means, both of said sensing means connected to fault detection means for detecting when either the position of said carriage or the spindle is outside of an acceptable deviation from their patterns of motion stored in memory in said controllers.

8. The thread tapper of claim 7, further including means for halting the operation of both the spindle and the feed motors when signalled by the fault detection means.

9. The thread tapper of claim 8, wherein said retract force means are two air cylinders positioned on opposite sides of said carriage, the air cylinders being actuated by regulated air supply means.

10. The thread tapper of claim 9, wherein the air supply to said cylinders is regulated to provide a greater force against said carriage during the advance portion of the tapping stroke than during the retract portion of the tapping stroke.

11. The thread tapper of claim 10, wherein the cam is reciprocated through less than a 360-degree arc during the repeating tapping operation, and the cam surface includes one operating portion for tapping and another operating portion which permits a greater retraction of the carriage to facilitate tap changing.

* * * * *